(12) United States Patent
Nakahara et al.

(10) Patent No.: US 9,299,492 B2
(45) Date of Patent: Mar. 29, 2016

(54) RESONANCE-TYPE NON-CONTACT POWER SUPPLY SYSTEM, POWER-RECEIVING-SIDE DEVICE AND POWER-TRANSMISSION-SIDE DEVICE

(71) Applicant: Yazaki Corporation, Tokyo (JP)

(72) Inventors: Takahiro Nakahara, Susono (JP); You Yanagida, Susono (JP); Antony Ngahu, Susono (JP)

(73) Assignee: Yazaki Corporation, Tokyo (JP)

( * ) Notice: Subject to any disclaimer, the term of this patent is extended or adjusted under 35 U.S.C. 154(b) by 421 days.

(21) Appl. No.: 14/046,563

(22) Filed: Oct. 4, 2013

(65) Prior Publication Data

US 2014/0042823 A1 Feb. 13, 2014

Related U.S. Application Data

(63) Continuation of application No. PCT/JP2012/060797, filed on Apr. 20, 2012.

(30) Foreign Application Priority Data

Apr. 22, 2011 (JP) .................. 2011-096362

(51) Int. Cl.
*H01F 38/14* (2006.01)
*H01M 10/46* (2006.01)
(Continued)

(52) U.S. Cl.
CPC .............. *H01F 38/14* (2013.01); *B60L 11/182* (2013.01); *B60L 11/1824* (2013.01); *H01F 27/346* (2013.01); *H01M 10/46* (2013.01); *H02J 5/005* (2013.01); *H02J 7/025* (2013.01); *H02J 17/00* (2013.01); *B60L 2270/147* (2013.01); *Y02T 10/7005* (2013.01); *Y02T 90/122* (2013.01); *Y02T 90/14* (2013.01)

(58) Field of Classification Search
CPC ........................................................ H01F 38/14
USPC ...................................................... 307/91, 104
See application file for complete search history.

(56) References Cited

U.S. PATENT DOCUMENTS

2008/0180332 A1 7/2008 Noro et al.
2010/0065352 A1 3/2010 Ichikawa
(Continued)

FOREIGN PATENT DOCUMENTS

CN 101438480 A 5/2009
EP 1 902 505 A2 3/2008
(Continued)

OTHER PUBLICATIONS

Search Report dated Aug. 3, 2015 issued by the European Patent Office in counterpart European Patent Application No. 12774391.2.
(Continued)

*Primary Examiner* — Robert Deberadinis
(74) *Attorney, Agent, or Firm* — Sughrue Mion, PLLC

(57) ABSTRACT

A resonance-type non-contact power supply system includes a power-transmission-side metal shield to cover an area around a primary coil and a primary resonance coil, and a power-receiving-side metal shield to cover an area around a secondary coil and a secondary resonance coil, and when charging is performed, the power-transmission-side metal shield and the power-receiving-side metal shield are connected with a case connector to be at the same potential.

8 Claims, 15 Drawing Sheets

(51) Int. Cl.
*H02J 17/00* (2006.01)
*B60L 11/18* (2006.01)
*H02J 5/00* (2006.01)
*H02J 7/02* (2006.01)
*H01F 27/34* (2006.01)

(56) References Cited

U.S. PATENT DOCUMENTS

| | | |
|---|---|---|
| 2010/0156343 A1 | 6/2010 | Jung |
| 2011/0148351 A1 | 6/2011 | Ichikawa |

FOREIGN PATENT DOCUMENTS

| | | |
|---|---|---|
| EP | 2 130 287 A1 | 12/2009 |
| EP | 2 306 615 A2 | 4/2011 |
| EP | 2 306 616 A2 | 4/2011 |
| JP | 5-344602 A | 12/1993 |
| JP | 2000-164379 A | 6/2000 |
| JP | 2008-182523 A | 8/2008 |
| JP | 2009-501510 A | 1/2009 |
| JP | 2010-40699 A | 2/2010 |
| JP | 2010-70048 A | 4/2010 |
| JP | 2010-98807 A | 4/2010 |
| JP | 2011-49825 A | 3/2011 |

OTHER PUBLICATIONS

International Search Report dated Jul. 3, 2012 issued in International Application No. PCT/JP2012/060797 (PCT/ISA/210).
Written Opinion dated Jul. 3, 2012 issued in International Application No. PCT/JP2012/060797 (PCT/ISA/237).
The Translation of the Written Opinion filed previously on Oct. 4, 2013, dated Jul. 3, 2012, issued by the International Searching Authority in corresponding International Application No. PCT/JP2012/060797.
Office Action, Issued by the State Intellectual Property Office of P.R. China, Dated Mar. 18, 2015, In counterpart Chinese Application No. 201280019805.X.

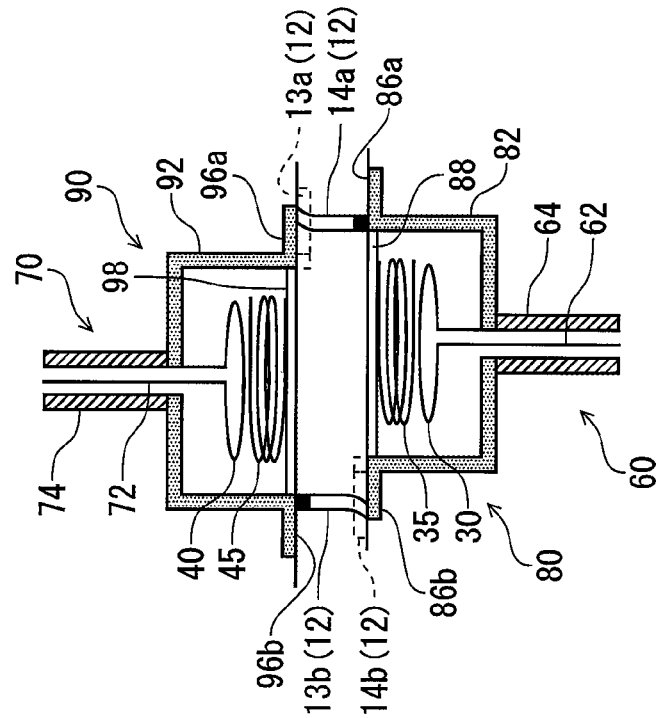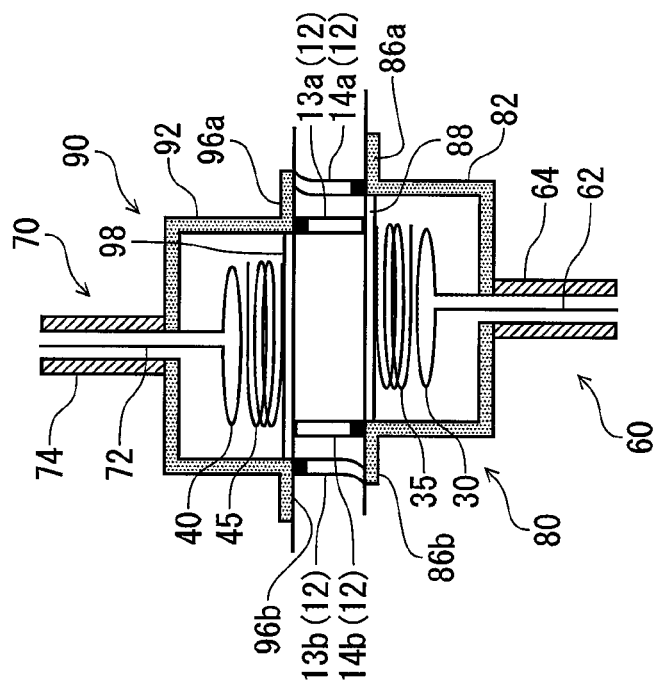

RESONANCE-TYPE NON-CONTACT POWER SUPPLY SYSTEM, POWER-RECEIVING-SIDE DEVICE AND POWER-TRANSMISSION-SIDE DEVICE

CROSS REFERENCE TO RELATED APPLICATIONS

This application is a continuation of PCT application No. PCT/JP2012/060797, which was filed on Apr. 20, 2012 based on Japanese Patent Application (No. 2011-096362) filed on Apr. 22, 2011, the contents of which are incorporated herein by reference. Also, all the references cited herein are incorporated as a whole.

BACKGROUND OF THE INVENTION

1. Technical Field

The present invention relates to a resonance-type non-contact power supply system, and a power-receiving-side device and a power-transmission-side device which are used in the resonance-type non-contact power supply system.

2. Background Art

A technique in which electric power is supplied to a load device by a non-contact system is known. In recent years, the non-contact power supply system is practically used even as a power supply system for electric vehicles, various standards are established, and safety for common use is considered.

There are various types of non-contact power supply system. A power supply system for electric vehicles is a resonance-type non-contact power supply system, which is shown in FIG. 1A, which greatly attracts attentions and whose basic principle is developed and demonstrated by Massachusetts Institute of Technology (MIT) (for example, refer to JP-A-2009-501510). The resonance-type non-contact power supply system shown in the figure includes a resonance system of a high frequency power supply, resonance coils (primary and secondary resonance coils) and a load that transmits electric power non-contactly. Specifically, power-transmission-side (primary side) devices include a high frequency power supply, a primary coil, and a primary resonance coil. Power-receiving-side (secondary side) devices include a secondary resonance coil, a secondary coil and a load. The power-transmission-side devices and the power-receiving-side devices in the system have an advantage of being able to supply electric power to a place spaced several meters with a high transmission efficiency (sometimes around 50%) by being magnetically coupled (electromagnetically coupled) by resonance.

In the technique of MIT shown in FIG. 1A, the resonance system is assumed to be configured with "a power supply part (the high frequency power supply and the primary coil), a resonance part (the primary resonance coil and the secondary resonance coil), and a load part (the secondary coil and the load)". However, additional components become necessary when the non-contact power supply system is mounted in an electronic device or an automobile power supply system. A system configuration example where the system of FIG. 1A is mounted in a real system is shown in FIG. 1B. As shown in the figure, in the real system, a transmission path between the power supply and a primary resonance coil part and a transmission path between a secondary resonance coil part and the load are necessary.

Related art is also disclosed in JP-A-2010-40699 and JP-A-5-344602.

A resonance-type non-contact power supply system 510 that is more specifically configured than in FIG. 1B is shown in FIG. 2. As shown in the figure, when coaxial cables (a power-transmission-side coaxial cable 60 and a power-receiving-side coaxial cable 70) are used, there are the following problems.

(1) When a coaxial cable is used for the transmission path, an electric current flows through not only the inner side but also the outer side of a coaxial cable outer conductor 64 of the primary coaxial cable (the power-transmission-side coaxial cable 60), and a radiated electromagnetic field occurs.

(2) Because part of the electromagnetic field from a primary coil 30 is coupled with the coaxial cable outer conductor 64 and an induced current flows, a radiated electromagnetic field occurs.

(3) Because all of the electromagnetic field from a secondary resonance coil 45 is not necessarily coupled with a secondary coil 40, part of the electromagnetic field is coupled with a coaxial cable outer conductor 74 of a power-receiving-side coaxial cable 70, and an induced current flows, a radiated electromagnetic field occurs.

An example in which the resonance-type non-contact power supply system 510 is applied to a charging system for electric vehicles or the like is shown in FIGS. 3A and 3B. Power-transmission-side (primary side) devices (20, 30 and 35) are arranged underground. When a vehicle 1 including power-receiving-side (secondary side) devices (50, 40 and 45) is placed above the power-transmission-side devices, non-contact power transmission is enabled. Since it is necessary for the charging system for electric vehicles to transmit electric power in a short time, it is thought that large electric power transmission that exceeds, for example, 1 kW is demanded. However, as shown in FIG. 3A, when the large electric power transmission is performed, a radiated electromagnetic field more than a reference value (DA) of ICNIRP human body protection guidelines may occur between the primary resonance coil 35 and the secondary resonance coil 45, that is, between the vehicle and the road surface. When the radiated electromagnetic field leaks out in a wide area, a human body M1 and electronic devices may be adversely affected. Therefore, as shown in FIG. 3B, in order that a danger zone where the electromagnetic field strength exceeds a reference value of ICNIRP human body protection guidelines may not be entered, measures to surround an area (the danger zone) where the transmission is performed with a shielding such as a fence 2 are considered. However, if a child M2 or a small animal P2 such as a pet who cannot understand a rule enters the danger zone, an accident may happen. Furthermore, it is considered to construct a system which stops charging immediately when sensors which are arranged in several places and sense whether the danger zone is entered recognize an entry. However, it is difficult to decide criteria for an object that entered the danger zone when the number of the sensors increases.

SUMMARY OF THE INVENTION

An exemplary embodiment of the invention is made in view of these situations, and the object of the exemplary embodiment is to provide a technique to solve the above problems.

According to an aspect of the exemplary embodiment, there is provided a power-transmission-side device used in a resonance-type non-contact power supply system, which transmits electric power by a non-contact resonance effect from a power-transmission-side resonance coil part connected to a high frequency power supply by a coaxial cable to a power-receiving-side resonance coil part, the power-transmission-side device including: a power-transmission-side shield part which is a good conductor and covers from outside to accommodate the power-transmission-side resonance coil part, and which is electrically connected to a housing of the high frequency power supply by an outer conductor of the coaxial cable, and a case connecting part which electrically connects the power-transmission-side shield part to a power-receiving-side shield part which is a good conductor and covers from outside to accommodate the power-receiving-side resonance coil part so that a positional deviation between the power-transmission-side shield part and the power-receiving-side shield part can be absorbed.

Further, the case connecting part may be constructed to connect the power-transmission-side shield part and the power-receiving-side shield part when non-contact power supply is performed, and to be accommodated when the non-contact power supply is not performed.

According to another aspect of the exemplary embodiment, there is provided a power-receiving-side device used in a resonance-type non-contact power supply system, which transmits electric power by a non-contact resonance effect from a power-transmission-side resonance coil part connected to a high frequency power supply to a power-receiving-side resonance coil part connected to a load device by a coaxial cable, the power-receiving-side device including: a power-receiving-side shield part which is a good conductor and covers from outside to accommodate the power-receiving-side resonance coil part, and which is electrically connected to a housing of the load device by an outer conductor of the coaxial cable, and a case connecting part which electrically connects the power-receiving-side shield part to a power-transmission-side shield part which is a good conductor and covers from outside to accommodate the power-transmission-side resonance coil part so that a positional deviation between the power-transmission-side shield part and the power-receiving-side shield part can be absorbed.

Further, the case connecting part may be constructed to electrically connect the power-receiving-side shield part and the power-transmission-side shield part when non-contact power supply is performed, and to be accommodated when the non-contact power supply is not performed.

Further, there is provided a resonance-type non-contact power supply system that transmits electric power by a non-contact resonance effect from a power-transmission-side resonance coil part, which is connected to a high frequency power supply by a first coaxial cable, to a power-receiving-side resonance coil part, which is connected to a load device by a second coaxial cable, the system including: a power-transmission-side shield part which is a good conductor and covers from outside to accommodate the power-transmission-side resonance coil part, and which is electrically connected to a housing of the high frequency power supply by an outer conductor of the first coaxial cable; a power-receiving-side shield part which is a good conductor and covers from outside to accommodate the power-receiving-side resonance coil part, and which is electrically connected to a housing of the load device by an outer conductor of the second coaxial cable, and a case connecting part which electrically connects the power-transmission-side shield part and the power-receiving-side shield part so that a positional deviation between the power-transmission-side shield part and the power-receiving-side shield part can be absorbed.

The power-receiving-side shield part may be provided with the case connecting part which is constructed to electrically connect the power-receiving-side shield part and the power-transmission-side shield part when non-contact power supply is performed, and to be accommodatable when the non-contact power supply is not performed.

The power-transmission-side shield part may be provided with the case connecting part which is constructed to electrically connect the power-receiving-side shield part and the power-transmission-side shield part when non-contact power supply is performed, and to be accommodatable when the non-contact power supply is not performed.

According to the exemplary embodiment, a technique to reduce the unnecessary radiated electromagnetic fields in the resonance-type non-contact power supply system can be provided.

BRIEF DESCRIPTION OF THE DRAWINGS

FIGS. 3A and 3B are figures which show an example in which the resonance-type non-contact power supply system of the related art is applied to a charging system for electric vehicles or the like.

FIGS. 9A and 9B are figures which schematically show an example of the power-transmission-side and the power-receiving-side metal shields which are connected by a case connecting part, according to the embodiment of the invention.

FIGS. 12A to 12C are figures which show measurement data that show the relationship between distance from a resonance coil center and electric field strength in the resonance-type non-contact power supply system, according to the embodiment of the invention, in which FIG. 12A is a figure which shows measurement points from the resonance coil center when the metal cases do not contact each other, FIG. 12B is a figure which shows measurement points from the resonance coil center when the metal cases contact each other, and FIG. 12C shows the measurement data which show the relationship between the distance from the resonance coil center and the electric field strength.

FIGS. 13A to 13C are figures which show measurement data that show the relationship between distance from a resonance coil center and magnetic field strength in the resonance-type non-contact power supply system, according to the embodiment of the invention, in which FIG. 13A is a figure which shows measurement points from the resonance coil center when the metal cases do not contact each other, FIG. 13B is a figure which shows measurement points from the resonance coil center when the metal cases contact each other, and FIG. 13C shows the measurement data which show the relationship between the distance from the resonance coil center and the electric field strength.

DETAILED DESCRIPTION OF THE EXEMPLARY EMBODIMENTS

Below, modes for carrying out the invention (hereinafter referred to as "embodiments") are explained with reference to the figures. An outline of the present embodiment is as follows. In the resonance-type non-contact power supply system of the present embodiment, areas around a primary and a secondary resonance coil parts are covered with metal cases (metal shields), and the metal cases are electrically connected with the outer conductors of coaxial line cables. When the resonance-type non-contact power supply system is provided to a charging system of electric vehicles or the like, areas where the electromagnetic field strength exceeds the reference value of the guidelines at the time of charging is reduced, and safe zones are secured with few sensors as possible. For this purpose, at the time of power supply (charging), the power-transmission-side and the power-receiving-side metal cases are electrically connected, and the potential difference between those two metal cases becomes zero. Furthermore, to secure the arrangement flexibility of a vehicle at the time of charging, a structure to absorb a positional deviation when the metal cases are electrically connected is adopted.

Figure 1A:
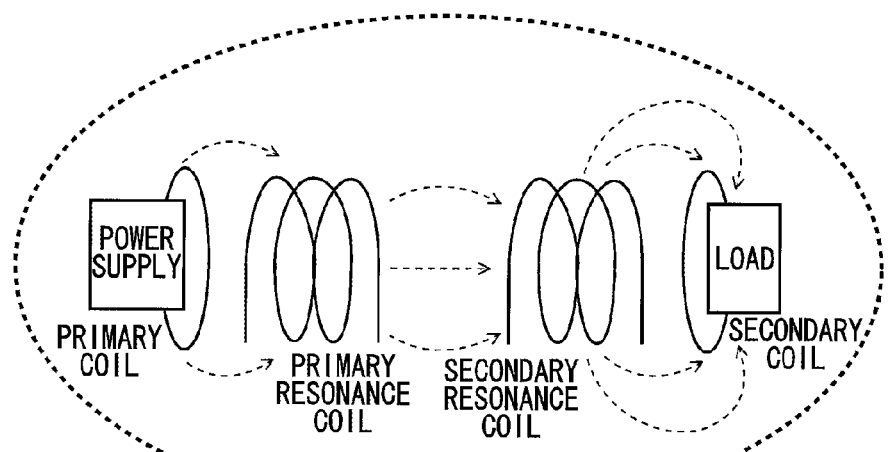
FIGS. 1A and 1B are figures to describe the principle of a resonance-type non-contact power supply system of the related art.
Figure 1B:
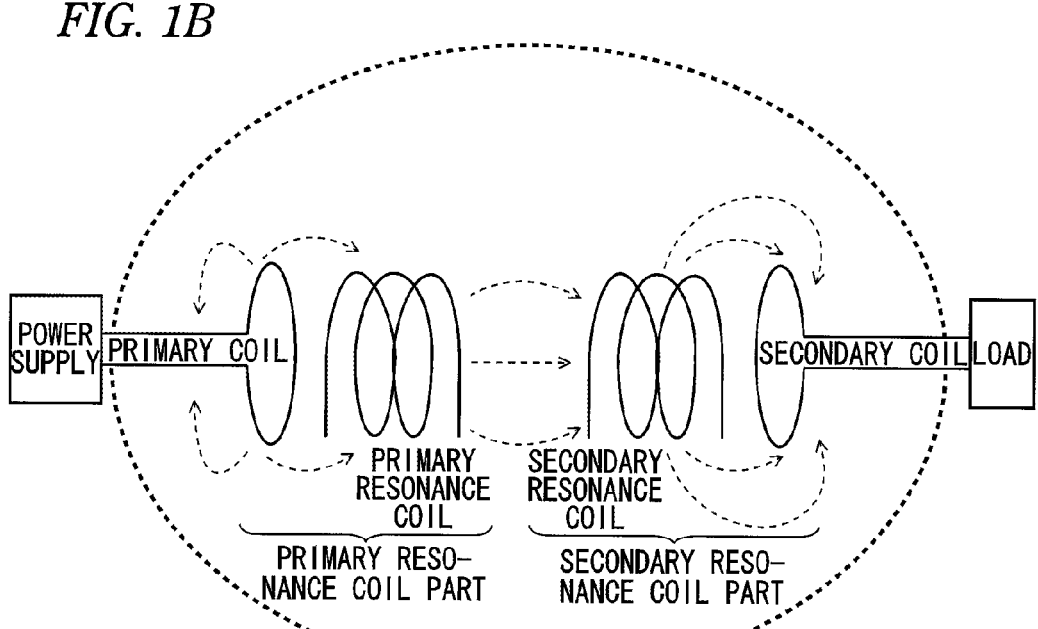
Figure 2:
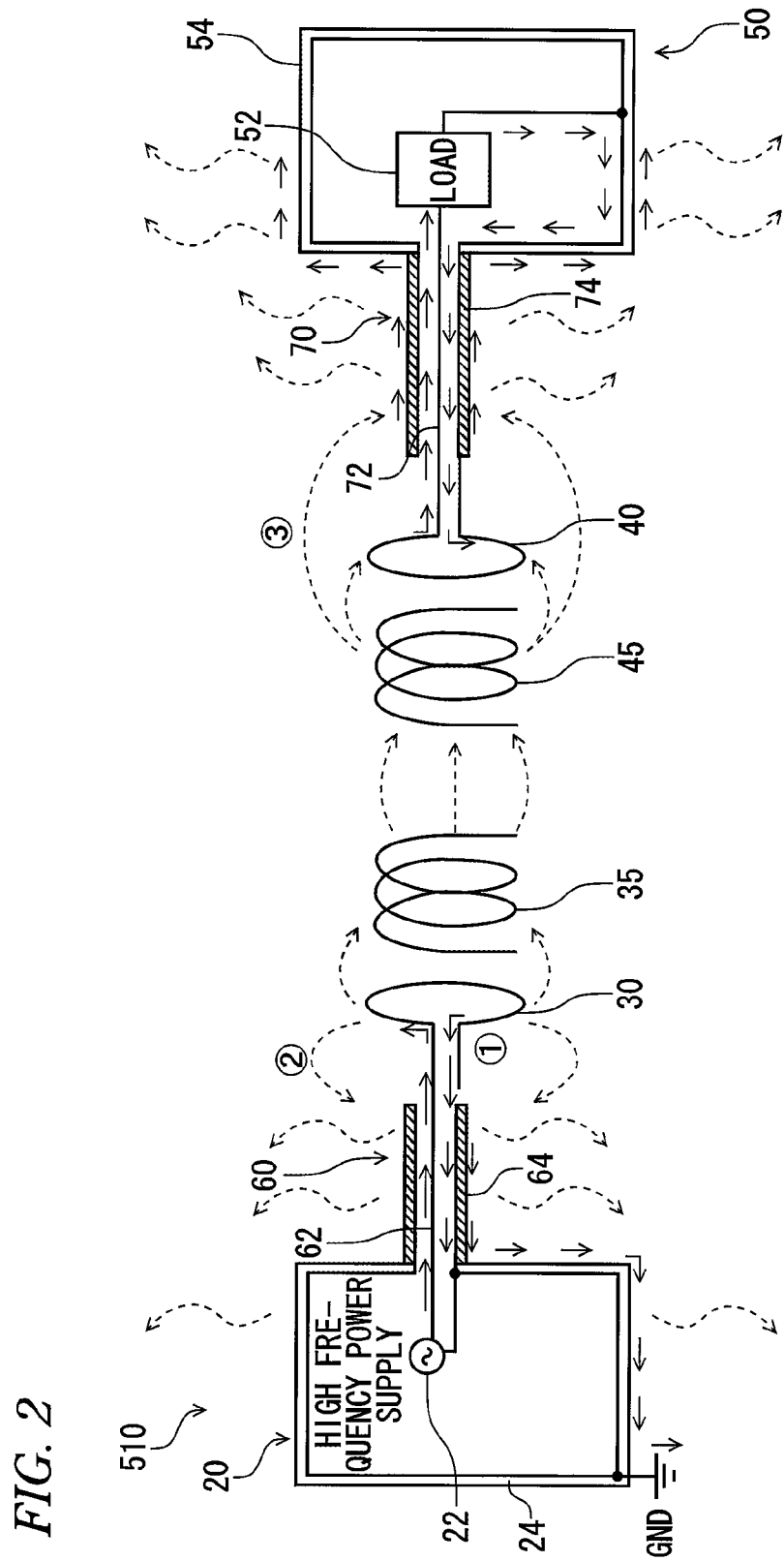
FIG. 2 is a figure which schematically shows the construction of the resonance-type non-contact power supply system of FIG. 1 of the related art when the resonance-type non-contact power supply system is mounted in a real system.
Figure 3A:
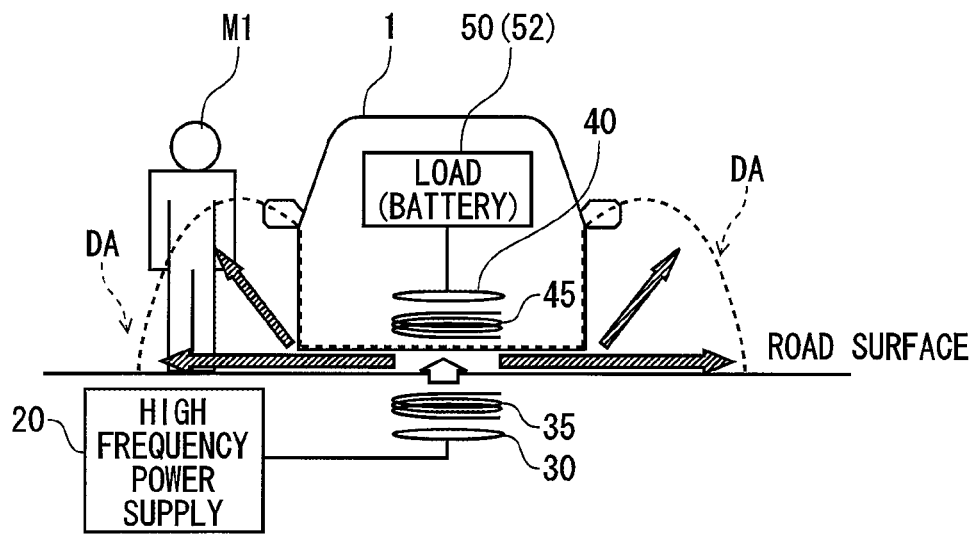
Figure 3B:
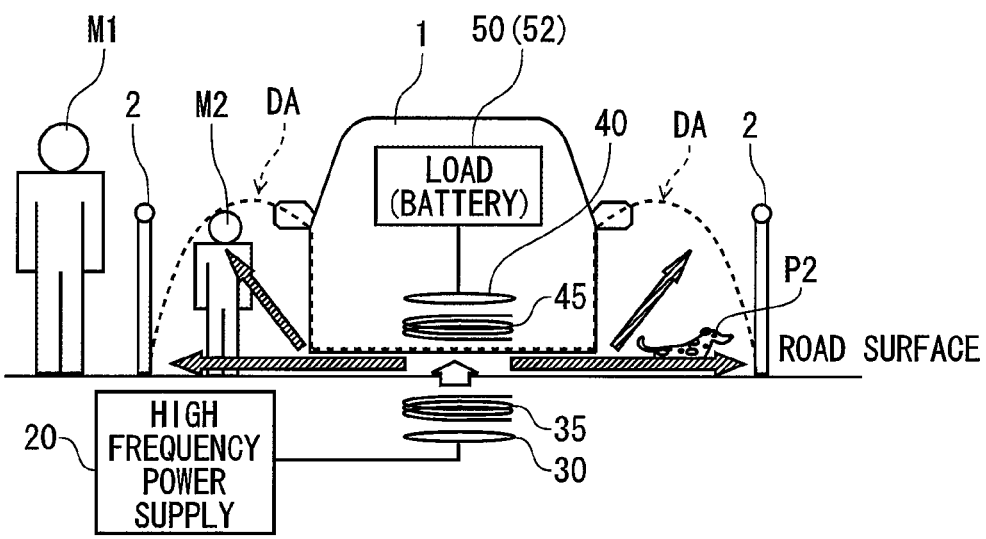

First, a model of a resonance-type non-contact power supply system 10 which is applied to an electric vehicle charging system is described with reference to FIG. 4. The resonance-type non-contact power supply system 10 is different from the resonance-type non-contact power supply system 510 of FIG. 2 in that a power-transmission-side metal shield (metal case) 80 and a power-receiving-side metal shield (metal case) 90 are provided. Other components are the same, and some of the same components are given the same symbols. Because the technique disclosed in JP-A-2009-501510 can be used to explain the electric power transmission principle of the resonance-type non-contact power supply system, the detailed description is omitted here.

The resonance-type non-contact power supply system 10 includes a high frequency power supply 20, a primary coil 30 and a primary resonance coil 35 as power-transmission-side (primary side) devices. When the resonance-type non-contact power supply system 10 is mounted in an electric vehicle charging system, the power-transmission-side (primary side) devices are embedded under a road surface. The primary coil 30 is connected to the high frequency power supply 20 by using a power-transmission-side coaxial cable 60. More specifically, the high frequency power supply 20 includes an oscillation source 22 inside a power supply housing 24, and is connected to the primary coil 30 by the power-transmission-side coaxial cable 60. The power supply housing 24 is grounded to a ground GND. To ground the power supply housing 24, an exclusive ground line may be used, or FG (Frame Ground) lines of AC cables or the like may be used. It is described that the system 10 includes the high frequency power supply 20, but the system may be constructed without the high frequency power supply 20. In this case, the system 10 may be so constructed that a suitable high frequency power supply outside the system 10 is connectable and electric power from the high frequency power supply may be received.

The resonance-type non-contact power supply system 10 includes the power-transmission-side metal shield 80 to cover the area around the primary coil 30 and the primary resonance coil 35. The power-transmission-side metal shield 80, for example, has an opening towards the power receiving side (secondary side; right side in the figure), has a case-like (tube-like) shape, and is made of metal of a good conductor such as steel or copper. That is, a shield side 82 of the power-transmission-side metal shield 80 completely covers the area around the primary coil 30 and the primary resonance coil 35 except the opening. A cylindrical shape, a prismatic shape or the like can be suitably adopted as the shape of the power-transmission-side metal shield 80 as long as the function as a shield case can be realized. The material of the power-transmission-side metal shield 80 may be suitably chosen as long as the power-transmission-side metal shield 80 is a conductor.

A shield bottom 84 of the power-transmission-side metal shield 80 is provided with a transmission opening for the transmission path between the high frequency power supply 20 and the primary coil 30, and the power-transmission-side coaxial cable 60 is connected to the transmission opening. More specifically, one end (at the right side in the figure) of a coaxial cable outer conductor 64 of the power-transmission-side coaxial cable 60 is connected to the shield bottom 84 of the power-transmission-side metal shield 80. The other end (at the left side in the figure) of the coaxial cable outer conductor 64 is connected to the power supply housing 24 of the high frequency power supply 20. A coaxial cable inner conductor 62 directly connects the oscillation source 22 of the high frequency power supply 20 and the primary coil 30.

On the other hand, the resonance-type non-contact power supply system 10 includes a load device 50, a secondary coil 40 and a secondary resonance coil 45 as power-receiving-side (secondary side) devices. When the resonance-type non-contact power supply system 10 is mounted in an electric vehicle charging system, the power-receiving-side (secondary side) devices are carried in a vehicle. A load 52 such as batteries is provided inside a load housing 54 of the load device 50. The load device 50 and the secondary coil 40 are connected by a power-receiving-side coaxial cable 70. It is described that the system 10 includes the load device 50, but the system may be constructed without the load device 50. In this case, the system 10 may be so constructed that a suitable load device outside the system 10 is connectable and electric power can be supplied to the load device.

The resonance-type non-contact power supply system 10 includes a power-receiving-side metal shield 90, like the power-transmission-side metal shield 80 at the power transmission side, to cover the secondary coil 40 and the secondary resonance coil 45. More specifically, the power-receiving-side metal shield 90, for example, has an opening towards the power transmission side (primary side; left side in the figure), has a case-like (tube-like) shape, and is made of metal of a good conductor such as steel or copper. That is, a shield side 92 of the power-receiving-side metal shield 90 completely covers the area around the secondary coil 40 and the secondary resonance coil 45 except the opening. A cylindrical shape, a prismatic shape or the like can be suitably adopted as the shape of the power-receiving-side metal shield 90 as long as the function as a shield case can be realized. The material of the power-receiving-side metal shield 90 may be suitably chosen as long as the power-receiving-side metal shield 90 is a conductor.

A shield bottom 94 of the power-receiving-side metal shield 90 is provided with a transmission opening for the transmission path between the load device 50 and the secondary coil 40, and the power-receiving-side coaxial cable 70 is connected to the transmission opening. More specifically, one end (at the left side in the figure) of a coaxial cable outer conductor 74 of the power-receiving-side coaxial cable 70 is connected to the shield bottom 94 of the power-receiving-side metal shield 90. The other end (at the right side in the figure) of the coaxial cable outer conductor 74 is connected to the load housing 54 of the load device 50. A coaxial cable inner conductor 72 is directly connected to the load 52 in the load housing 54.

In the resonance-type non-contact power supply system 10 having the above-mentioned construction, while the transmission path from the oscillation source 22 to the primary coil 30 and the transmission path from the load 52 to the secondary coil 40 are formed, the oscillation source 22 oscillates at a high frequency of, for example, several MHz to several 10 MHz, and the oscillation output is supplied to the primary coil 30. The primary resonance coil 35 amplifies the electric power of the primary coil 30, and produces an electromagnetic field towards the secondary resonance coil 45. The secondary resonance coil 45 is coupled with the electromagnetic field that is produced by the primary resonance coil 35, and produces an induced current to the secondary coil 40. As a result, the electric power is supplied to the load 52.

At this time, because, at the power transmission side of the above described related-art resonance-type non-contact power supply system 510, an induced current flows to the ground GND through not only the inner side but also the outer side of the coaxial cable outer conductor 64 of the power-transmission-side coaxial cable 60, a radiated electromagnetic field occurs around the power-transmission-side coaxial cable 60. Because, at the power receiving side of the resonance-type non-contact power supply system 510, all of the electromagnetic field from the secondary resonance coil 45 is not coupled with the secondary coil 40, part of the electromagnetic field is coupled with the coaxial cable outer conductor 74, and an induced current, which becomes a transmission loss, occurs, a radiated electromagnetic field occurs around the power-receiving-side coaxial cable 70 as a result.

However, in the present embodiment, collection of transmission energy inside the power-transmission-side coaxial cable 60 and the power-receiving-side coaxial cable 70 is improved. That is, because the area around the power-transmission-side (primary side) resonance part (the primary coil 30 and the primary resonance coil 35) is covered by the power-transmission-side metal shield 80, and the power-transmission-side metal shield 80 and the coaxial cable outer conductor 64 of the power-transmission-side coaxial cable 60 are electrically connected, the electric current which flows out to the outside of the coaxial cable outer conductor 64 at the power transmission side can be collected inwards. Similarly, because the area around the power-receiving-side (primary side) resonance part (the secondary coil 40 and the secondary resonance coil 45) is covered by the power-receiving-side metal shield 90, and the power-receiving-side metal shield 90 and the coaxial cable outer conductor 74 of the power-receiving-side coaxial cable 70 are electrically connected, the electric current which flows out to the outside of the coaxial cable outer conductor 74 at the power receiving side can be collected inwards. As a result, the transmission efficiency can be improved, and the radiated electromagnetic field can be reduced.

Figure 4:
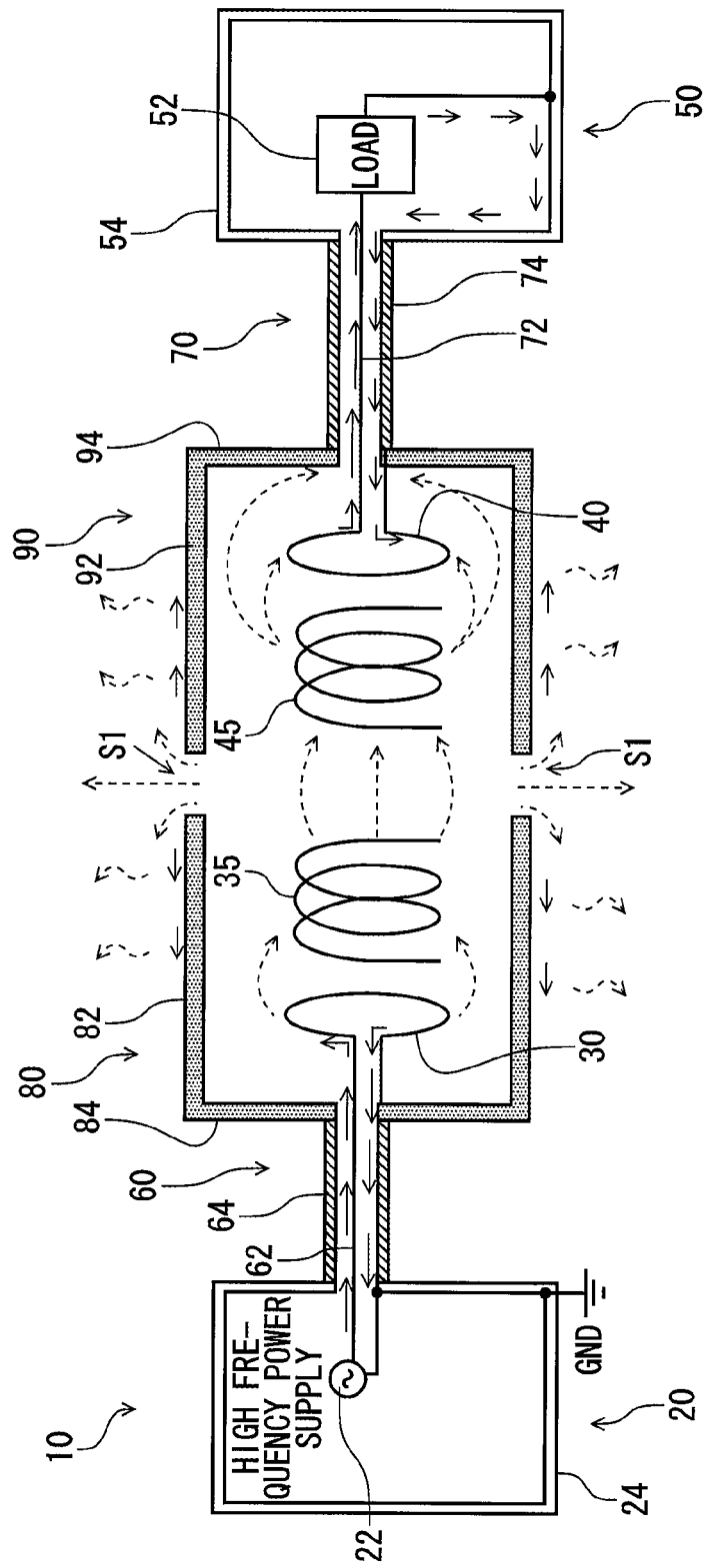
FIG. 4 is a schematic block diagram which shows the construction of a resonance-type non-contact power supply system including power-transmission-side and power-receiving-side metal shields according to an embodiment of the invention.

Although the reduction of the radiated electromagnetic field can be realized by the construction shown in FIG. 4, because large electric power transmission is assumed in the electric vehicle charging system as described above, further reduction is necessary. In the above construction, a potential difference may be produced between the power-transmission-side metal shield 80 and the power-receiving-side metal shield 90. When a potential difference occurs, an electric field occurs. Further, an electromagnetic field may leak from a space 51 between the power-transmission-side metal shield 80 and the power-receiving-side metal shield 90 to the outside. Although the electric field can be greatly reduced as compared to before, it is desirable to bring the electric field close to zero.

Figure 5:
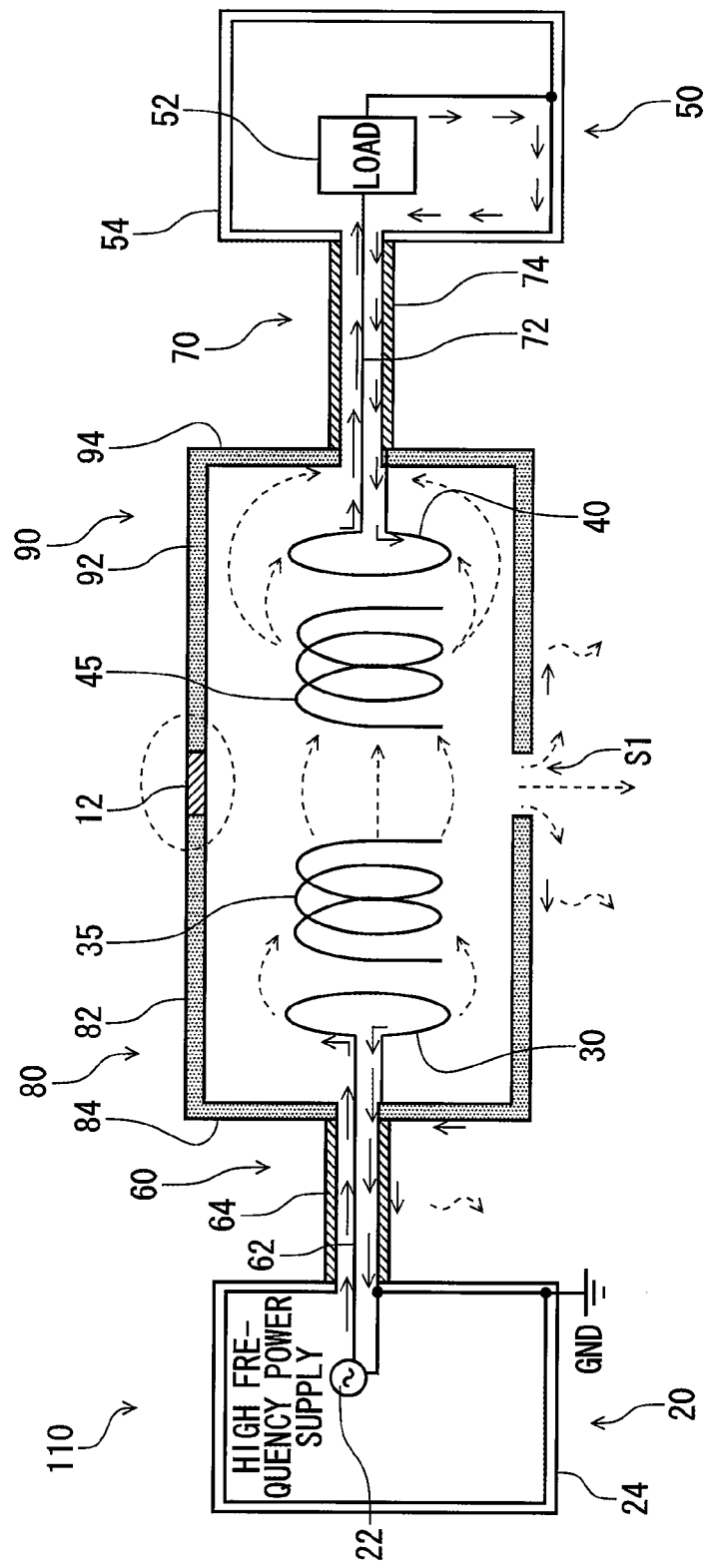
FIG. 5 is a schematic block diagram which shows the construction of a resonance-type non-contact power supply system, in which power-transmission-side and power-receiving-side metal shields are connected, according to the embodiment of the invention.

Thus, as shown in FIG. 5, by providing a case connector 12 to electrically connect the power-transmission-side metal shield 80 and the power-receiving-side metal shield 90, the potential difference between the power-transmission-side metal shield 80 and the power-receiving-side metal shield 90 disappears, and the electric field that occurs due to the potential difference can be prevented from occurring.

Figure 6:
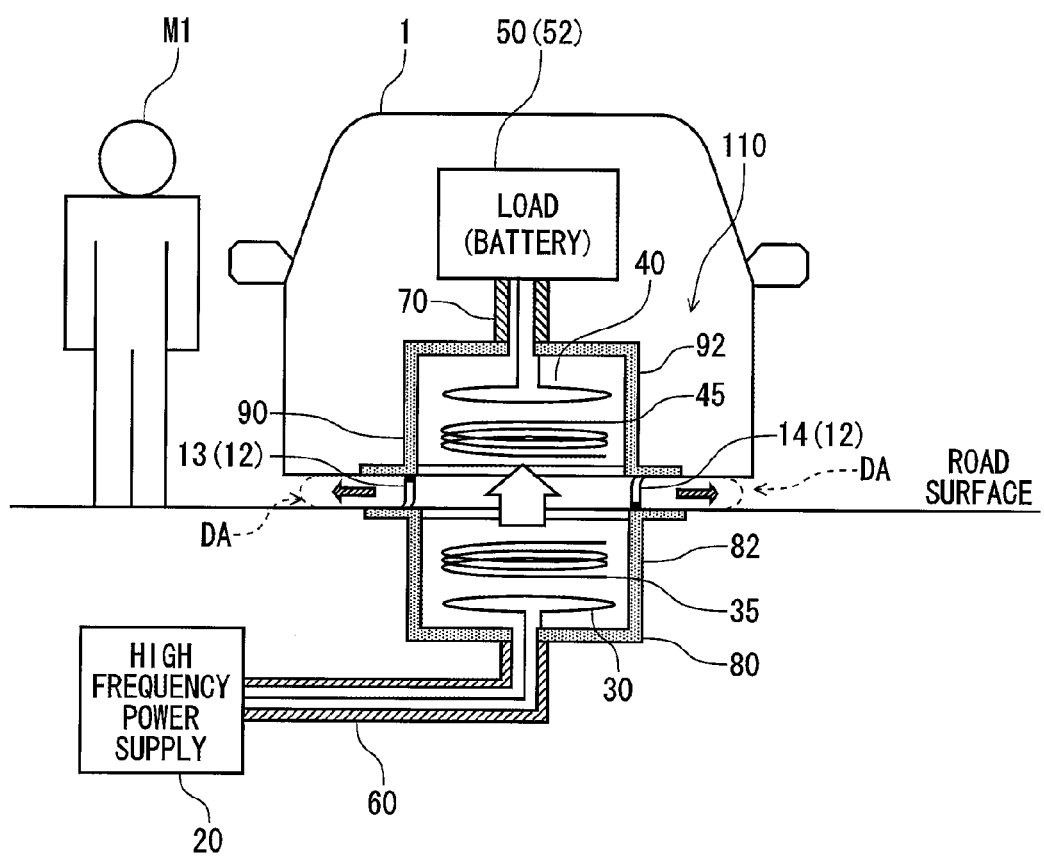
FIG. 6 is a figure which shows an example in which the resonance-type non-contact power supply system, in which the power-transmission-side and power-receiving-side metal shields are connectable, is applied to a charging system for electric vehicles or the like, according to the embodiment of the invention.

Then, with reference to a resonance-type non-contact power supply system 110 of FIG. 6, a detailed embodiment which is applied in an electric vehicle charging system is described. The construction of the resonance-type non-contact power supply system 110 is basically the same as that of the above-mentioned resonance-type non-contact power supply system 10.

As shown in the figure, the power-transmission-side devices including the high frequency power supply 20 and the primary resonance coil 35 are embedded under a road surface. The primary resonance coil 35 is arranged near the road surface. The area around the primary resonance coil 35 is covered by the power-transmission-side metal shield 80 as shown in FIGS. 4 and 5. The upper side (the side of the vehicle 1) of the power-transmission-side metal shield 80 in the figure becomes the opening where there is no shield material. However, the opening is covered with a cover body 88 of materials such as resin. It is preferable that the material of the cover body 88 does not affect the coupling of electric fields.

A power-transmission-side case connecting part 14 is provided near the upper distal end of the shield side 82 of the power-transmission-side metal shield 80 as the case connector 12. Although specific examples of the power-transmission-side case connecting part 14 are illustrated in FIGS. 7A to 9B, the power-transmission-side case connecting part 14 is a conductor, and has a shape that can be transformed. More specifically, the power-transmission-side case connecting part 14 is a board-like body, is maintained as a usually desired shape when no charging is performed, and can be transformed when in contact with the power-receiving-side metal shield 90 of the vehicle 1 to secure the connection. For example, the material of the power-transmission-side case connecting part 14 may be conductive rubber or resin material whose surface is processed to have conductivity. The power-transmission-side case connecting part 14 is usually arranged horizontally on the road surface, and is vertically driven by a motor or the like at the time of charging. It is preferable that there are a plurality of power-transmission-side case connecting parts 14 in view of a parking positional tolerance of the vehicle 1 and the variety of the shape of the power-receiving-side metal shield 90.

On the other hand, the power-receiving-side devices including the load device 50 which is a battery device and the secondary resonance coil 45 are carried in the vehicle 1. The secondary resonance coil 45 is arranged near the floor of the vehicle 1. The area around the secondary resonance coil 45 is covered by the power-receiving-side metal shield 90 as shown in FIGS. 4 and 5. The lower side (the side of the road surface) of the power-receiving-side metal shield 90 in the figure becomes the opening where there is no shield material. However, the opening is covered with a cover body 98 of material such as resin. It is preferable that the material of the cover body 98 does not affect the coupling of electric fields.

A power-receiving-side case connecting part 13 is provided near the lower distal end of the shield side 92 of the power-receiving-side metal shield 90 as the case connector 12. Although specific examples of the power-receiving-side case connecting part 13 are illustrated in FIGS. 7A to 9B, the power-receiving-side case connecting part 13 is a conductor, and has a shape that can be transformed. More specifically, the power-receiving-side case connecting part 13 is a board-like body, is maintained as a usually desired shape when no charging is performed, and can be transformed when in contact with the power-transmission-side metal shield 80 at the charging position to secure the connection. For example, the material of the power-receiving-side case connecting part 13 may be conductive rubber or resin material whose surface is processed to have conductivity. The power-receiving-side case connecting part 13 is usually arranged horizontally on the floor surface (lower outer surface) of the vehicle 1, and is vertically driven by a motor or the like at the time of charging. It is preferable that there are a plurality of power-receiving-side case connecting parts 13, like the power-transmission-side case connecting parts 14, in view of a parking positional tolerance of the vehicle 1 and the variety of the shape of the power-transmission-side metal shield 80.

Although it is described that the resonance-type non-contact power supply system 110 includes both the power-receiving-side case connecting part 13 and the power-transmission-side case connecting part 14, it is also possible that the resonance-type non-contact power supply system 110 includes either of the power-receiving-side case connecting part 13 and the power-transmission-side case connecting part 14.

When the vehicle 1 is located on the power-transmission-side devices including the primary resonance coil 35 for the purpose of charging, the primary resonance coil 35 and the secondary resonance coil 45 face each other. Prior to the transmission for charging, the power-receiving-side case connecting part 13 and the power-transmission-side case connecting part 14, as the case connector 12, are driven so that their positions are controlled. As a result, as shown in FIG. 6, the power-receiving-side case connecting part 13 is connected to the, power-transmission-side metal shield 80 and the power-transmission-side case connecting part 14 is connected to the power-receiving-side metal shield 90. At this time, the power-receiving-side case connecting part 13 and the power-transmission-side case connecting part 14 are formed to be longer than the distance between the vehicle 1 and the road surface, and by flexing the power-receiving-side case connecting part 13 and the power-transmission-side case connecting part 14 so that they are pressed at the time of connecting, an electrical connection is well maintained. Generally, it is thought that, prior to the charging, a user authentication process is performed by communication with a device which manages the vehicle 1 and the power-transmission-side devices. By incorporating a determination whether or not the connection of the case connector 12 is secured in one process of the authentication process, and controlling so that a charging process will not start when the connection is not secured, a safe charging system can be implemented.

Then, construction variations of the power-receiving-side case connecting part 13 and the power-transmission-side case connecting part 14 are described with reference to FIGS. 7A to 9B.

Figure 7A:
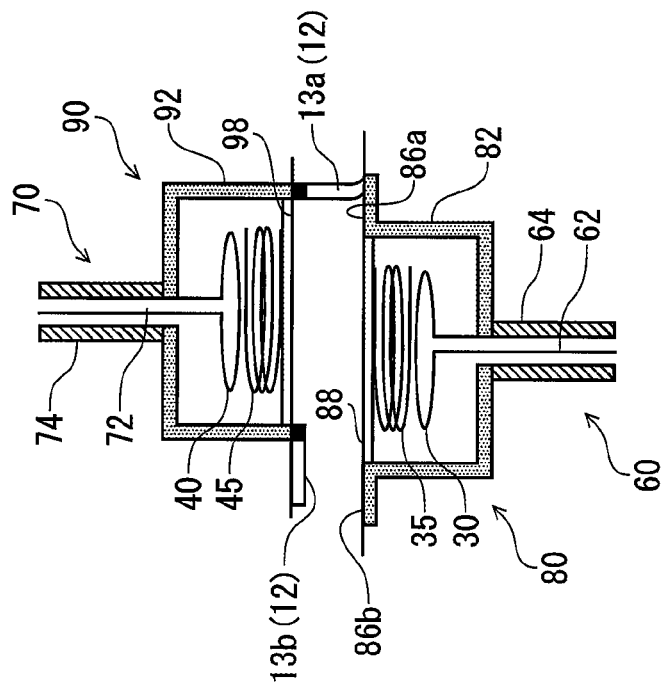
FIGS. 7A and 7B are figures which schematically show an example of the power-transmission-side and the power-receiving-side metal shields which are connected by a case connecting part, according to the embodiment of the invention.
Figure 7B:
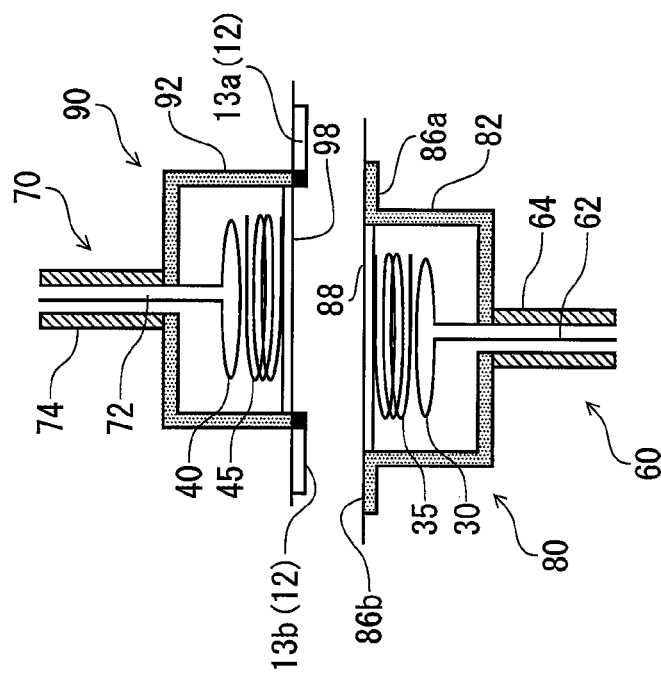

FIGS. 7A and 7B show that the power-receiving-side metal shield 90 of the vehicle 1 is provided with the power-receiving-side case connecting part 13 (13a, 13b), and the power-transmission-side metal shield 80 is not provided with the case connector 12 (the power-transmission-side case connecting part 14).

The upper end, namely, the end at the road surface side, of the shield side 82 of the power-transmission-side metal shield 80 is provided with a plane-formed shield front part 86 (86a, 86b), which extends outwards a given length beyond the opening end and is formed to face the floor of the vehicle 1. The extension length is set by assuming an allowable range in which the parking position of the vehicle 1 may deviate.

When charging is not performed, as shown in FIG. 7A, and the power-receiving-side case connecting part 13 (13a, 13b) is maintained horizontally. When the charging is performed, the power-receiving-side case connecting part 13 is driven to become vertical, and as shown in FIG. 7B, the power-receiving-side case connecting part 13a at the right side in the figure is flexed and connected to the shield front part 86a at the right side in the figure. On the other hand, because even if the power-receiving-side case connecting part 13b at the left side in the figure is controlled to become vertical, the shield front part 86 is not located right below, the power-receiving-side case connecting part 13b is accommodated horizontally. Because the shield front part 86 is a conductor, whether the shield front part 86 is right below can be determined by a known sensing technology.

Contrary to FIGS. 7A and 7B, FIGS. 8A and 8B show that only the power-transmission-side metal shield 80 is provided with the case connector 12 (power-transmission-side case connecting parts 14a, 14b).

The lower end, namely, the end at the floor side, of the shield side 92 of the power-receiving-side metal shield 90 is provided with a plane-formed shield front part 96 (96a, 96b), which extends outwards a given length beyond the opening end and is formed to face the road surface. The extension length is set by assuming an allowable range in which the parking position of the vehicle 1 may deviate.

Figure 8A:
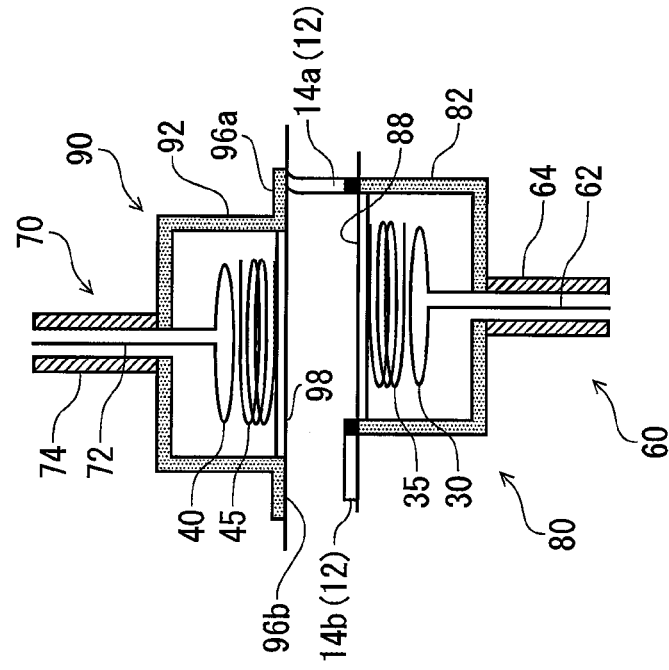
FIGS. 8A and 8B are figures which schematically show an example of the power-transmission-side and the power-receiving-side metal shields which are connected by a case connecting part, according to the embodiment of the invention.
Figure 8B:
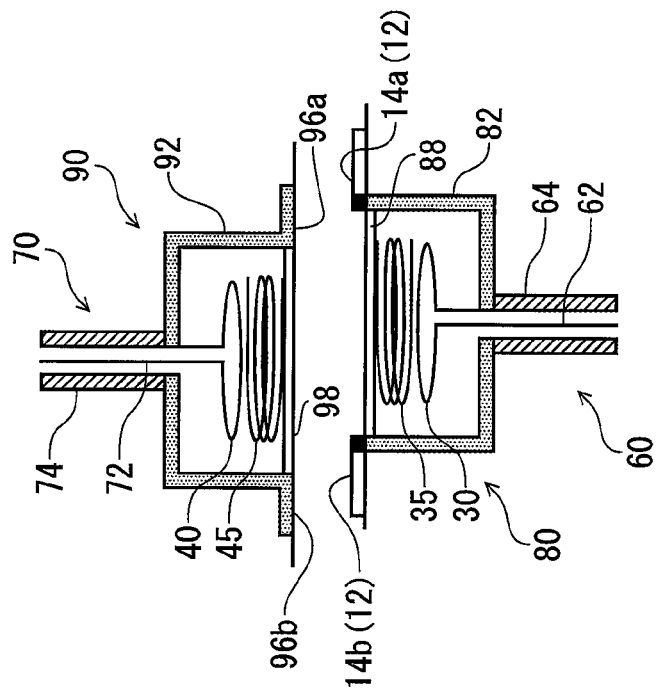

When charging is not performed, as shown in FIG. 8A, the power-transmission-side case connecting part 14 (14a, 14b) is maintained horizontally (parallel to the floor). When the charging is performed, the power-transmission-side case connecting part 14 is driven to become vertical, and as shown in FIG. 8B, the power-transmission-side case connecting part 14a at the right side in the figure is flexed and connected to the shield front part 96a at the right side in the figure. On the other hand, because even if the power-transmission-side case connecting part 14b at the left side in the figure is controlled to become vertical, the shield front part 86b is not located right above, the power-transmission-side case connecting part 14b is accommodated horizontally. Because the shield front part 96 is a conductor, whether the shield front part 96 is right above can be determined by a known sensing technology.

FIGS. 9A and 9B show that both the power-transmission-side metal shield 80 and the power-receiving-side metal shield 90 are provided with the case connector 12. The power-transmission-side metal shield 80 includes the shield front part 86 and includes the power-transmission-side case connecting part 14. Similarly, the power-receiving-side metal shield 90 includes the shield front part 96 and includes the power-receiving-side case connecting part 13. When charging is performed, the power-receiving-side case connecting part 13 and the power-transmission-side case connecting part 14 are driven to become vertical so that the power-transmission-side metal shield 80 and the power-receiving-side metal shield 90 are electrically connected. The power-transmission-side case connecting part 14a at the right side and the power-receiving-side case connecting part 13b at the left side in the figure are vertically flexed and connected. On the other hand, the power-transmission-side case connecting part 14b at the left side and the power-receiving-side case connecting part 13a at the right side in the figure as shown with broken lines, which are not used for connection, are maintained horizontally.

Sensing results of the shield front parts 86, 96 as mentioned above can be used to determine whether any one of the case connectors 12 is driven vertically or maintained horizontally. It also can be assumed that both the power-receiving-side case connecting part 13 and the power-transmission-side case connecting part 14 are used for connection. In such a case, if the case connector 12 which is moved with precedence is set beforehand, a smooth operation is enabled.

Figure 10:
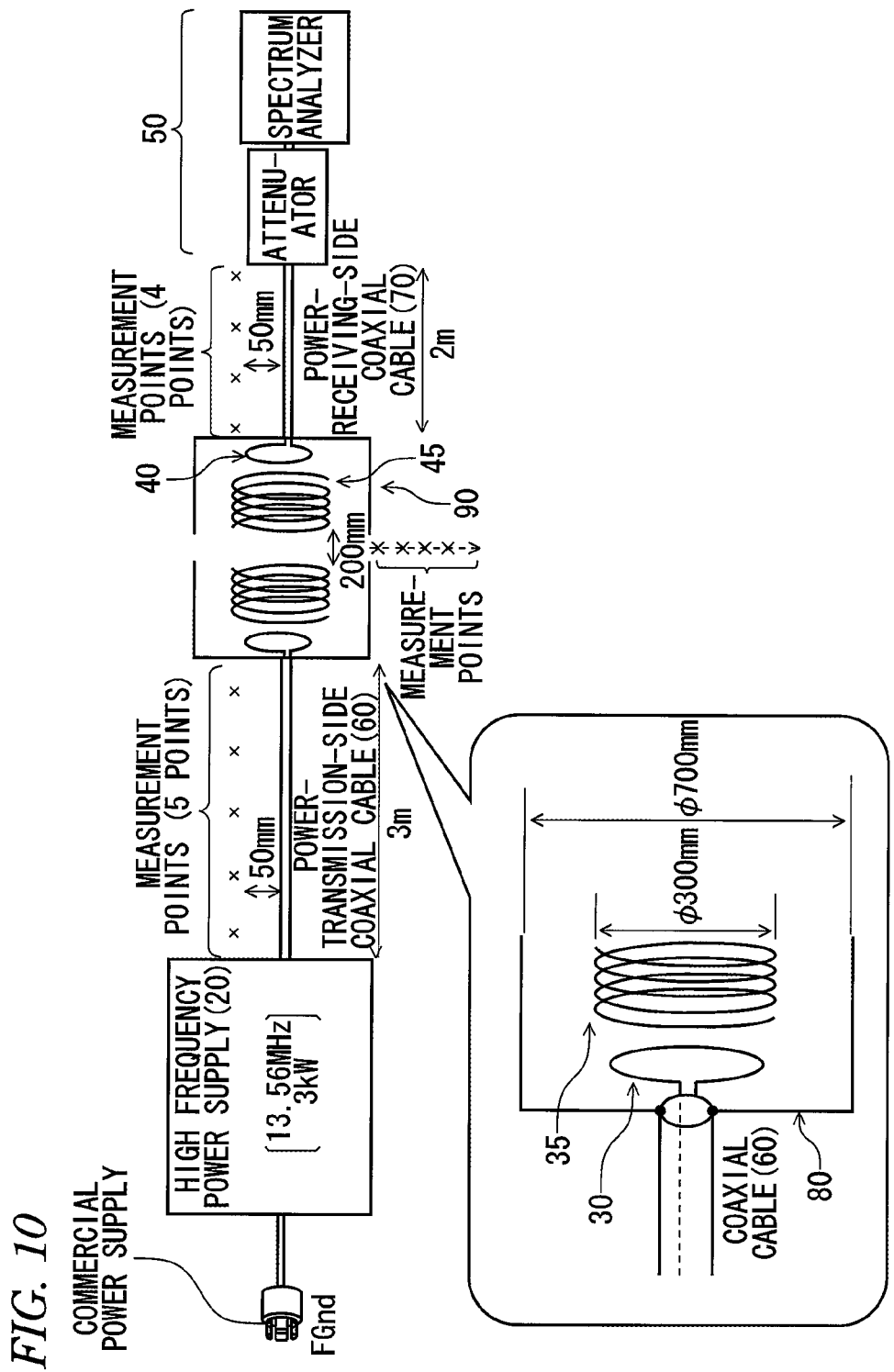
FIG. 10 is a figure which shows the construction of a system of measuring the electromagnetic field strength in the related-art resonance-type non-contact power supply system that is a comparative example, according to the embodiment of the invention.
Figure 11:
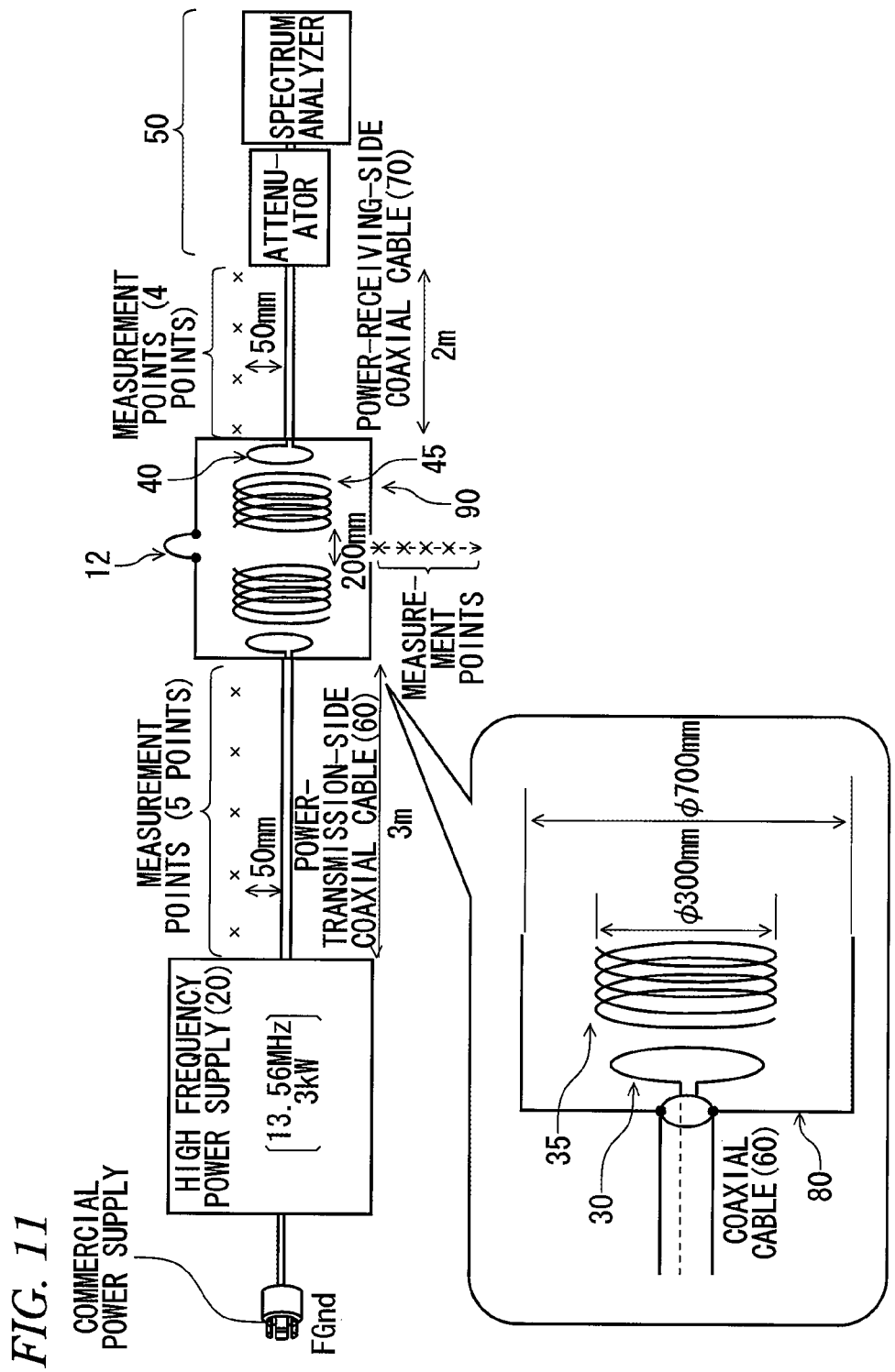
FIG. 11 is a figure which shows the construction of a system of measuring the electromagnetic field strength in the resonance-type non-contact power supply system of the embodiment of the invention, according to the embodiment of the invention.

Next, with reference to FIGS. 10 to 15, the radiated electromagnetic fields in the resonance-type non-contact power supply system 110 in which the power-transmission-side metal shield 80 (power-transmission-side case) and the power-receiving-side metal shield 90 (power-receiving-side case) are electrically connected with the case connector 12 and the resonance-type non-contact power supply system 10 in which the power-transmission-side metal shield 80 and the power-receiving-side metal shield 90 are not electrically connected with the case connector 12 are measured. Measurement results are described. FIG. 10 shows the system configuration of a measurement system corresponding to the resonance-type non-contact power supply system 10 in which the power-transmission-side metal shield 80 and the power-receiving-side metal shield 90 are not electrically connected with the case connector 12. FIG. 11 shows the system configuration of a measurement system corresponding to the resonance-type non-contact power supply system 110 in which the power-transmission-side metal shield 80 and the power-receiving-side metal shield 90 are electrically connected with the case connector 12.

Summaries of the system configurations of the measurement systems of FIGS. 10 and 11 are as follows.
(1) The high frequency power supply 20: the frequency is 13.56 MHZ (+−1 MHz), and the output power is 3 kW.
(2) The coaxial cable (the power-transmission-side coaxial cable 60): a coaxial cable (3 m) is used as a high frequency electric power transmission line and connects the high frequency power supply 20 and the loop coil (the primary coil 30), and there are 5 electromagnetic field measurement spots (spaced 50 cm).
(3) The coaxial cable (the power-receiving-side coaxial cable 70): a coaxial cable (2 m) is used as a high frequency electric power transmission line and connects the power-receiving-side loop coil (the secondary coil 40) and the attenuator (load).
(4) The loop coils (30, 40): the loop coils 30, 40 are made of copper, have a diameter of 150 mm, and are made of copper wires of 5 mm in diameter, and the power-transmission-side construction is the same as the power-receiving-side construction.
(5) The resonance coils (35, 45): the resonance coils are made of copper, have a diameter of 300 mm, an inside diameter of 185 mm and a pitch of 5 mm, and are spiral coils made of copper wires of 5 mm in diameter, the power-transmission-side construction is the same as the power-receiving-side construction, and the distance between the coils is 200 mm.
(6) The metal cases (the power-transmission-side and power-receiving-side metal shields 80, 90): the metal cases are connected to the coaxial cable outer conductors 64, 74 of the power-transmission-side and the power-receiving-side coaxial cables 60, 70 to cover the loop coils (30, 40) and the resonance coils (35, 45).
(7) The load device 50: the power-receiving-side high frequency electric power is attenuated a given quantity by the attenuator, and a signal level is measured with a spectrum analyzer.
(8) The case connector 12 <FIG. 11; only for the present embodiment>: the power-transmission-side and the power-receiving-side metal shields 80, 90 are connected by the case connector 12, and the potential difference between the two metal shields becomes zero.

Figure 12C:
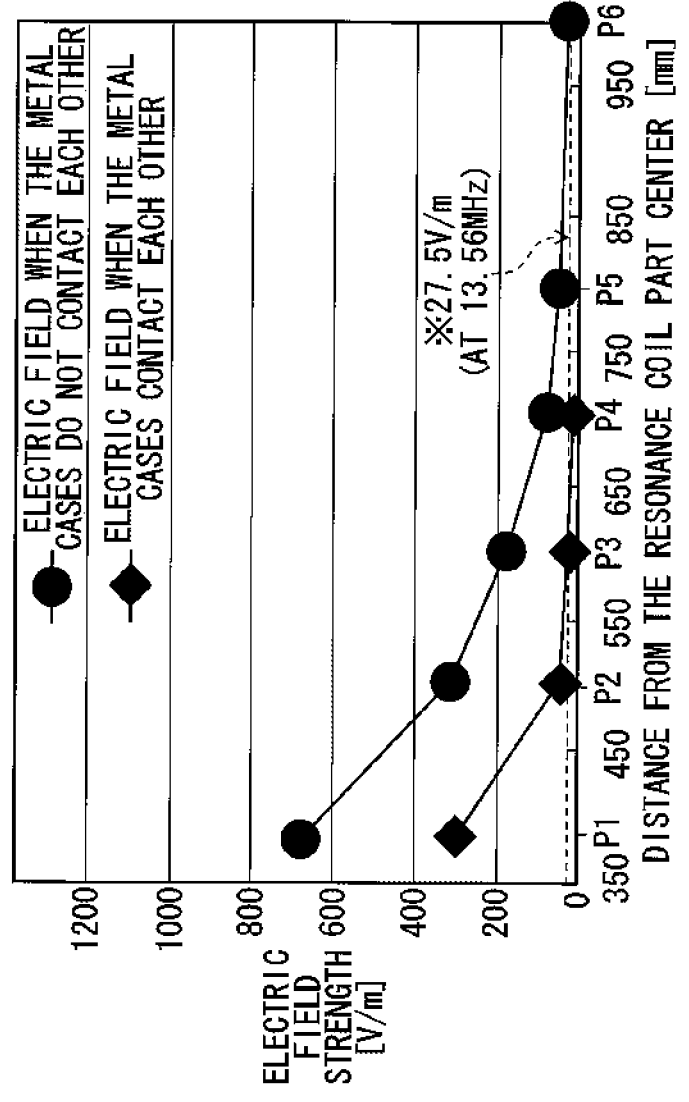
Figure 12A:
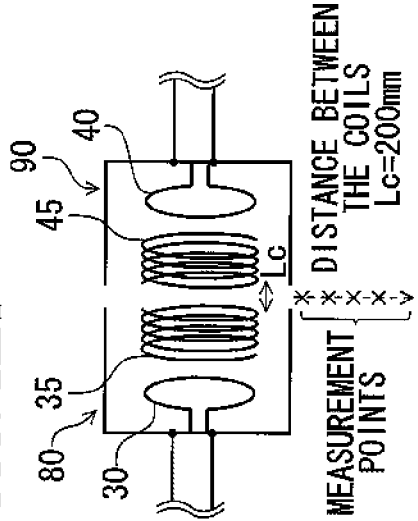
Figure 12B:
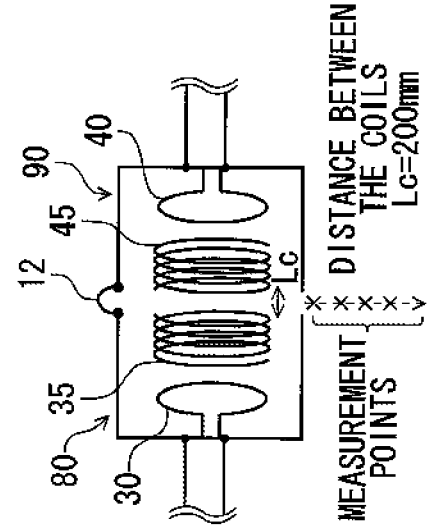

Measurement results regarding the relationship between the distance from the center of the primary resonance coil 35 and the secondary resonance coil 45 and the electric field strength are shown in FIGS. 12A to 12C. As shown in the figure, when the power-transmission-side metal shield 80 and the power-receiving-side metal shield 90 are not connected by the case connector 12, the measured electric field is less than 27.5 V/m that is a value in ICNIRP human body protection guidelines (referred to as, "guidelines", hereinafter) for the first time at a position P6. This is because the electric field that leaks from the space between the power-transmission-side metal shield 80 and the power-receiving-side metal shield 90 is large, and the danger zone becomes wide. On the other hand, when the power-transmission-side metal shield 80 and the power-receiving-side metal shield 90 are connected by the case connector 12 and the potential difference becomes zero, the electric field that leaks to the outside is significantly reduced. The electric field at a position P2 (about 500 mm away) almost becomes the same value as that in the guidelines, and the electric field at a position P3 (about 600 mm away) becomes less than the value in the guidelines. Thus, the danger zone in which the electric field is larger than the value in the guidelines can be significantly reduced.

Figure 13C:
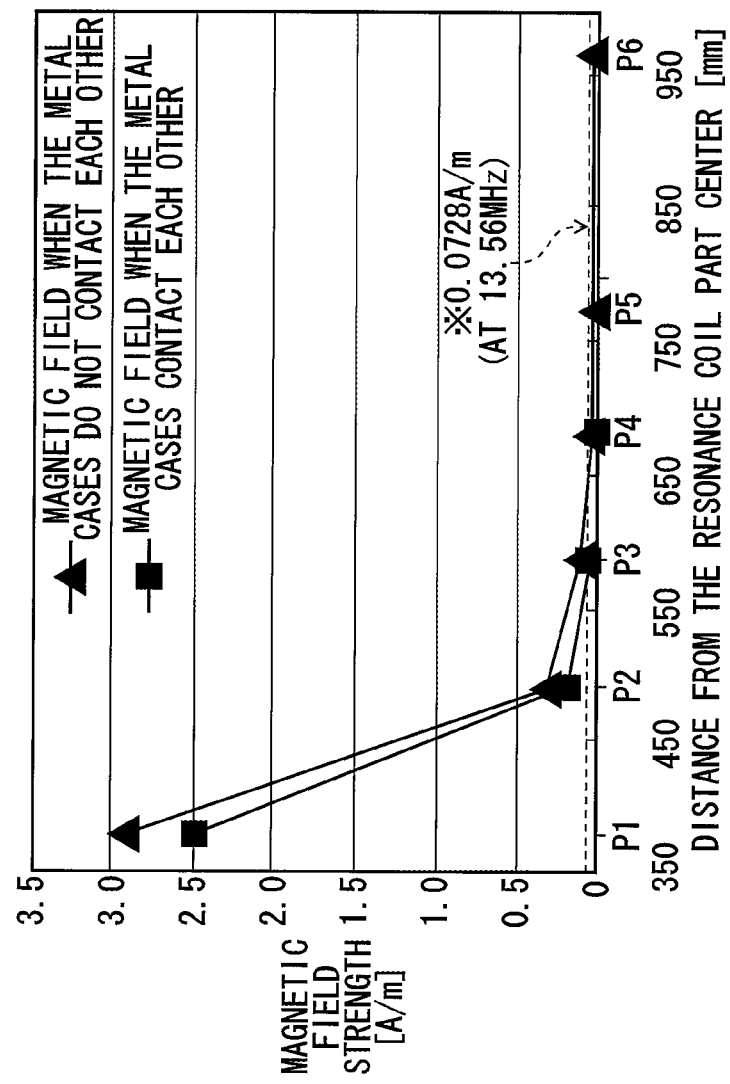
Figure 13A:
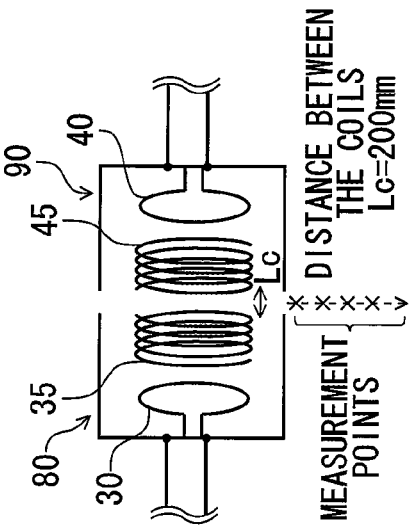
Figure 13B:
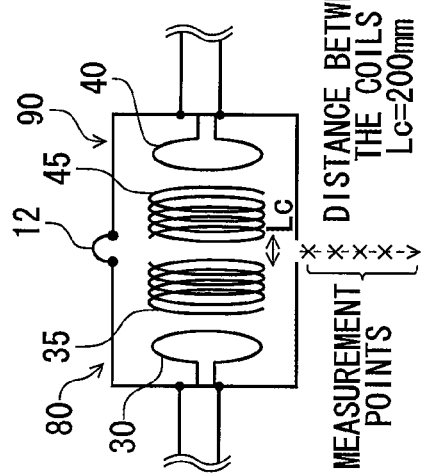

Measurement results regarding the relationship between the distance from the center of the primary resonance coil 35 and the secondary resonance coil 45 and the magnetic field strength are shown in FIGS. 13A to 13C. From the measurement results shown in the figure, it can be seen that the magnetic field strength when the power-transmission-side metal shield 80 and the power-receiving-side metal shield 90 are connected is not significantly different from, but slightly less than that when the power-transmission-side metal shield 80 and the power-receiving-side metal shield 90 are not connected. This is because the magnetic field occurs as electromagnetically coupled energy between the primary resonance coil 35 and the secondary resonance coil 45 not due to the potential difference between the power-transmission-side metal shield 80 and the power-receiving-side metal shield 90, and the leakage largely depends on the distance between the power-transmission-side metal shield 80 and the power-receiving-side metal shield 90. Therefore, because the distance between the power-transmission-side metal shield 80 and the power-receiving-side metal shield 90 is fixed, the change of the magnetic field is not observed obviously.

Figure 14:
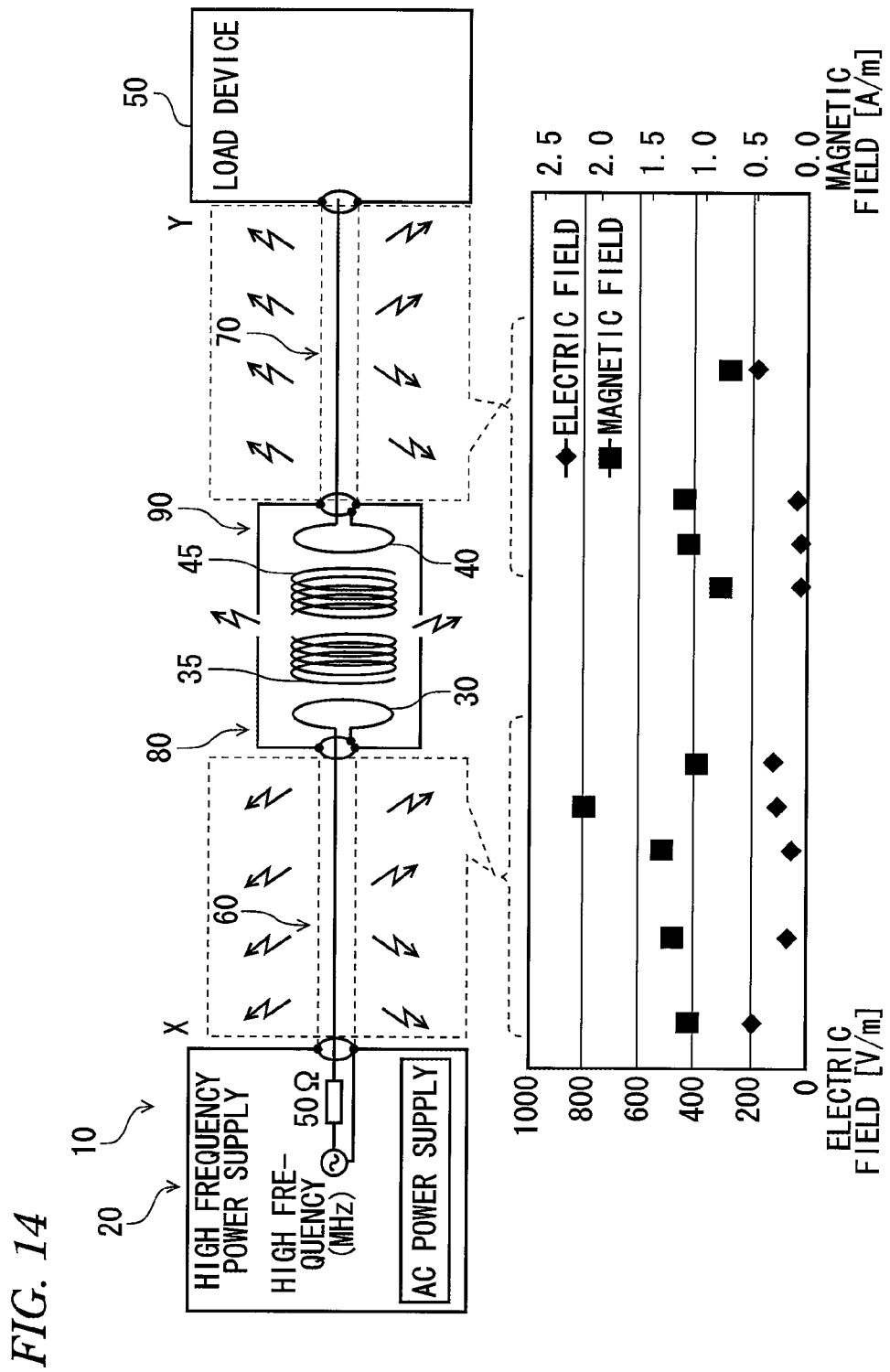
FIG. 14 is a figure which shows measurement data of the electromagnetic field strength near the coaxial cables in the related-art resonance-type non-contact power supply system that is the comparative example, according to the embodiment of the invention.
Figure 15:
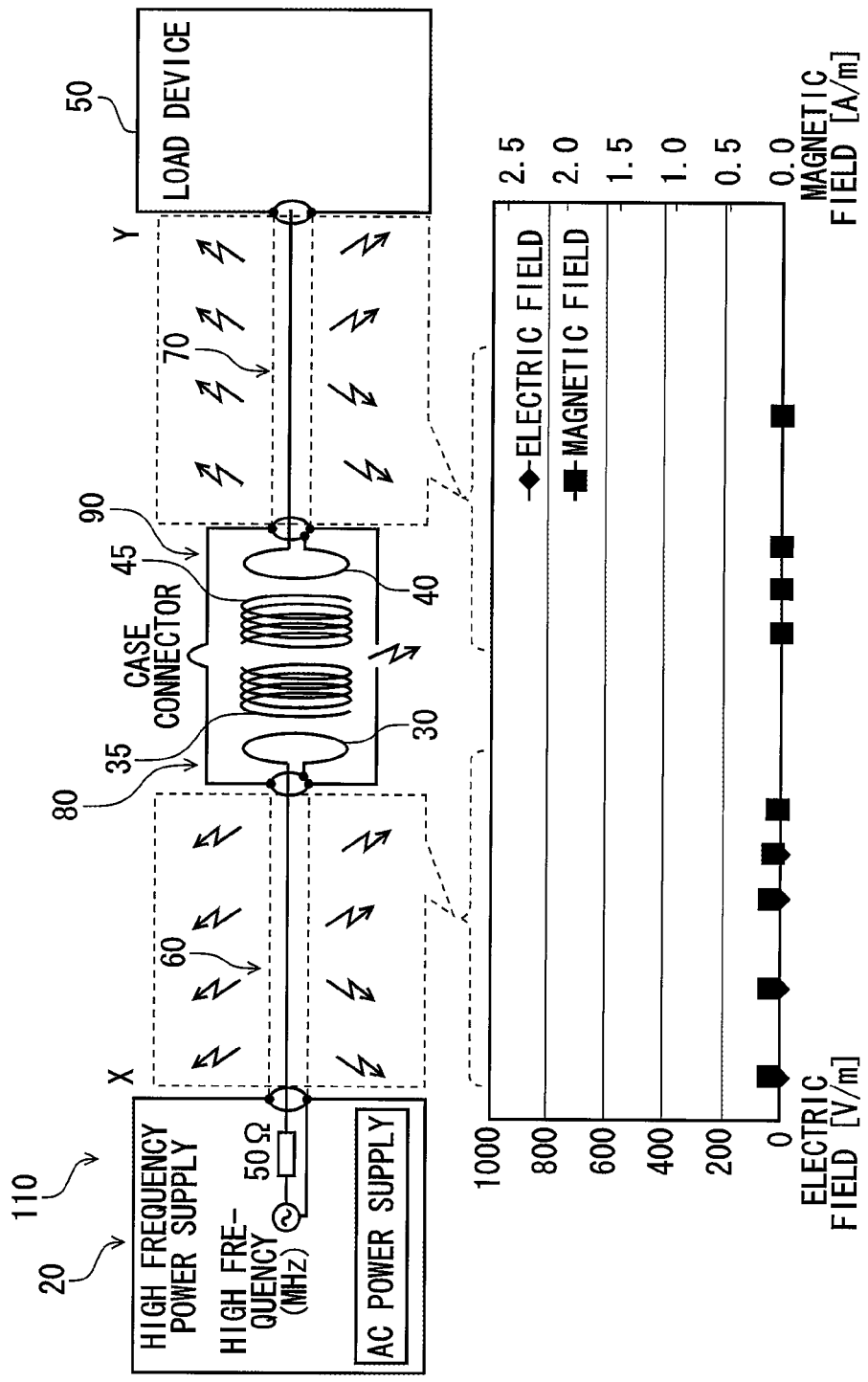
FIG. 15 is a figure which shows measurement data of the electromagnetic field strength near the coaxial cables in the resonance-type non-contact power supply system, according to the embodiment of the invention.

Results of measuring the electromagnetic field strength (electric field and radiated electromagnetic field) around the power-transmission-side and the power-receiving-side coaxial cables 60, 70 are shown in FIGS. 14 and 15. FIG. 14 shows the measurement result of the resonance-type non-contact power supply system 10 in which the power-transmission-side metal shield 80 and the power-receiving-side metal shield 90 are not electrically connected by the case connector 12. FIG. 15 shows the measurement result of the resonance-type non-contact power supply system 110 in which the power-transmission-side metal shield 80 and the power-receiving-side metal shield 90 are electrically connected by the case connector 12.

An outline of the measurement conditions is as follows.

Electromagnetic field sensors were installed at measurement points. The vertical distance from the measurement point to the electromagnetic field sensor surface was 50 mm.

Electric power of a frequency of 13.56 MHz and 3 KW was output from the high frequency power supply 20, and the maximum electric field values and the maximum magnetic field values measured by the electromagnetic field sensors were acquired.

First, as shown in FIG. 14, in the resonance-type non-contact power supply system 10 which does not have the case connector 12, the electric field at the power transmission side was measured to have values of 400-800 V/m. The electric field at the power receiving side was measured to have values of about 200-400 V/m. The magnetic field was measured to have values of about 0.2-0.5 A/m.

On the other hand, for the resonance-type non-contact power supply system 110 including the case connector 12, the measurement results shown in FIG. 15 indicates that both the electric field and the magnetic field had values of approximate 0. Thus, by adopting the resonance-type non-contact power supply system 110 including the case connecting part, the radiated electromagnetic field can be significantly reduced.

According to the present embodiment, the transmission efficiency can be improved and the radiated electromagnetic field can be reduced in a simple and low cost way. By placing the metal cases only around the resonance coil parts, the weight can be less than that when the whole system is shielded. Thereby, even if the power supply system is carried on a mobile body such as a vehicle, the increase of the energy consumption due to the weight increase can be suppressed. Furthermore, when charging is performed, the danger zone can be significantly decreased, and measures against entries to the danger zone become easy. That is, devices such as human sensors can be significantly reduced, and operations can be performed simply.

The present invention is described based on the embodiments as above. The above embodiments are illustrative and it is understood by those skilled in the art that it is possible to make various modifications to those components and their combination and that these modifications are also in the scope of the invention. For example, the primary resonance coil 35 and the secondary resonance coil 45 are loop power-supply type (indirect type) ones for which the primary coil 30 and the secondary coil 40 are used, but the primary resonance coil 35 and the secondary resonance coil 45 may be direct power-supply type ones. Besides, among the provided case connector 12 (the power-receiving-side case connecting part 13 and the power-transmission-side case connecting part 14), the transmission outputs may be changed according to the connection number, and the transmission outputs may be reduced when the connection number is below a given number.

Although the invention is described in detail with reference to specific embodiments, it is apparent that various modifications and amendments may be made by those skilled in the art without departing from the spirit and scope of the invention.

The present invention is useful in the field of resonance-type non-contact power supply systems.

What is claimed is:

1. A power-transmission-side device used in a resonance-type non-contact power supply system, which transmits electric power by a non-contact resonance effect from a power-transmission-side resonance coil part connected to a high frequency power supply by a coaxial cable to a power-receiving-side resonance coil part, the power-transmission-side device comprising:

a power-transmission-side shield part which is a good conductor and covers from outside to accommodate the power-transmission-side resonance coil part, and which is electrically connected to a housing of the high frequency power supply by an outer conductor of the coaxial cable, and a case connecting part which electrically connects the power-transmission-side shield part to a power-receiving-side shield part which is a good conductor and covers from outside to accommodate the power-receiving-side resonance coil part so that a positional deviation between the power-transmission-side shield part and the power-receiving-side shield part can be absorbed.

2. The power-transmission-side device according to claim 1, wherein the case connecting part is constructed to connect the power-transmission-side shield part and the power-receiving-side shield part when non-contact power supply is performed, and to be accommodated when the non-contact power supply is not performed.

3. A power-receiving-side device used in a resonance-type non-contact power supply system, which transmits electric power by a non-contact resonance effect from a power-transmission-side resonance coil part which is connected to a high frequency power supply to a power-receiving-side resonance coil part connected to a load device by a coaxial cable, the power-receiving-side device comprising:

a power-receiving-side shield part which is a good conductor and covers from outside to accommodate the power-receiving-side resonance coil part, and which is electrically connected to a housing of the load device by an outer conductor of the coaxial cable, and a case connecting part which electrically connects the power-receiving-side shield part to a power-transmission-side shield part which is a good conductor and covers from outside to accommodate the power-transmission-side resonance coil part so that a positional deviation between the power-transmission-side shield part and the power-receiving-side shield part can be absorbed.

4. The power-receiving-side device according to claim 3, wherein the case connecting part is constructed to electrically connect the power-receiving-side shield part and the power-transmission-side shield part when non-contact power supply is performed, and to be accommodated when the non-contact power supply is not performed.

5. A resonance-type non-contact power supply system that transmits electric power by a non-contact resonance effect from a power-transmission-side resonance coil part, which is connected to a high frequency power supply by a first coaxial cable, to a power-receiving-side resonance coil part, which is connected to a load device by a second coaxial cable, the system comprising:
- a power-transmission-side shield part which is a good conductor and covers from outside to accommodate the power-transmission-side resonance coil part, and which is electrically connected to a housing of the high frequency power supply by an outer conductor of the first coaxial cable;
- a power-receiving-side shield part which is a good conductor and covers from outside to accommodate the power-receiving-side resonance coil part, and which is electrically connected to a housing of the load device by an outer conductor of the second coaxial cable, and
- a case connecting part which electrically connects the power-transmission-side shield part and the power-receiving-side shield part so that a positional deviation between the power-transmission-side shield part and the power-receiving-side shield part can be absorbed.

6. The resonance-type non-contact power supply system according to claim 5, wherein the power-receiving-side shield part is provided with the case connecting part which is constructed to electrically connect the power-receiving-side shield part and the power-transmission-side shield part when non-contact power supply is performed, and to be accommodatable when the non-contact power supply is not performed.

7. The resonance-type non-contact power supply system according to claim 5, wherein the power-transmission-side shield part is provided with the case connecting part which is constructed to electrically connect the power-receiving-side shield part and the power-transmission-side shield part when non-contact power supply is performed, and to be accommodatable when the non-contact power supply is not performed.

8. The resonance-type non-contact power supply system according to claim 6, wherein the power-transmission-side shield part is provided with the case connecting part which is constructed to electrically connect the power-receiving-side shield part and the power-transmission-side shield part when non-contact power supply is performed, and to be accommodatable when the non-contact power supply is not performed.

* * * * *